S. M. MORRISON.
HARVESTER-RAKE.

No. 173,042. Patented Feb. 1, 1876.

UNITED STATES PATENT OFFICE.

SAMUEL M. MORRISON, OF FAIRFIELD, IOWA.

IMPROVEMENT IN HARVESTER-RAKES.

Specification forming part of Letters Patent No. 173,042, dated February 1, 1876; application filed April 24, 1875.

*To all whom it may concern:*

Figure 1:
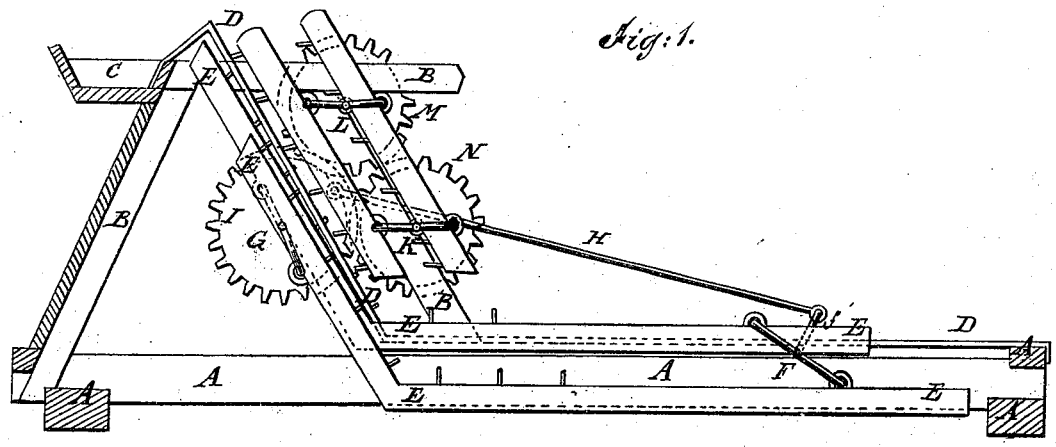
Figure 2:
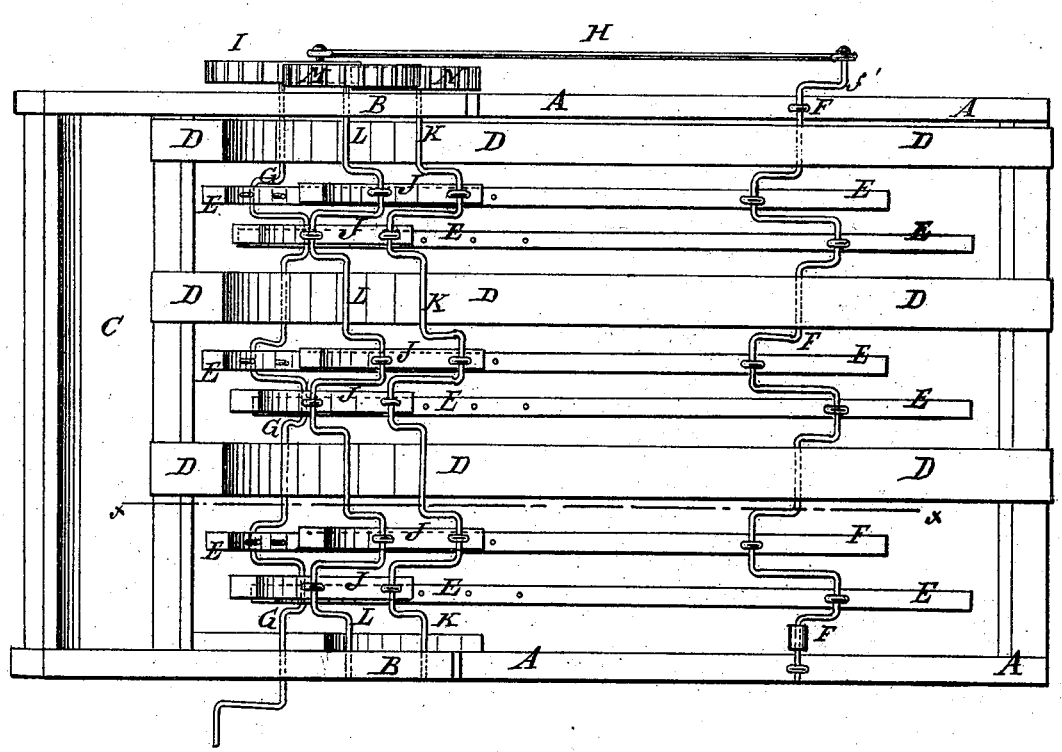

Be it known that I, SAMUEL M. MORRISON, of Fairfield, Jefferson county, Iowa, have invented a new and useful Improvement in Grain-Elevating Attachment for Harvesters, of which the following is a specification:

Figure 1 is a vertical section of a portion of a harvester to which my improvement has been applied, and Fig. 2 is a top view of the same.

Similar letters of reference indicate corresponding parts.

The object of this invention is to furnish an improved attachment for the class of harvesters that raise the cut grain to the binders' table by the action of vibrating rakes, so as to cause the grain to be delivered to the binders straight and even, whether the grain be long or short, heavy or light, straight or tangled, weedy or clean, wet or dry, and which will require no adjustment to adapt it to the different conditions of the grain.

The invention consists in the combination of the upper rakes and their crank-shafts with the lower angular rakes and their crank-shafts, as hereinafter fully described.

A represents the horizontal part, and B the elevated or inclined part, of the platform-frame. C is the receiver and trough, into which the grain is delivered, and from which it is taken by the binders. D are the bars upon which the cut grain falls, and along which it is moved by the rakes. E are the lower or main rakes, which are made with an angle corresponding with the angle between the horizontal and inclined parts of the platform. Three pairs of the rakes E are used, and they are hung upon double cranks formed upon the shafts F G, which shafts work in bearings attached to the horizontal and inclined parts A B of the platform-frame, so that the two rakes of each pair may be always moving in opposite directions. To one end of the crank-shaft F, that supports the horizontal parts of the rakes E, is attached, or upon it is formed, a crank, $f'$, to which is pivoted the end of a connecting-bar, H. The other end of the connecting-rod H is pivoted to the crank-pin of the gear-wheel I, attached to the end of the crank-shaft G, that supports the inclined parts of the rakes E. J are three pairs of rakes, having teeth upon their lower sides, and which are placed directly in front of, and parallel with, the inclined parts of the rakes E. The rakes J are hung upon double cranks formed upon the shafts K L, which revolve in bearings attached to the inclined part B of the platform-frame. The cranks of the shafts K L are set at about right angles with the cranks of the shaft G, which causes a slight variation of speed of the rakes during a portion of their revolution, and the consequent jostling of the grain has a tendency to cause tangled grain to become parallel with the teeth which are set in horizontal lines. The upper rakes are so set that their teeth may slightly overlap the teeth of the lower rakes, while leaving sufficient space between the rake-bars, so that light and heavy grain will be carried up with the same facility. To the ends of the shafts K L are attached the equal gear-wheels M N, the teeth of which mesh into the teeth of the crank gear-wheel I, so that all the crank-shafts, F G K L, may revolve uniformly.

Having thus described my invention, I claim as new and desire to secure by Letters Patent—

The combination of the upper rakes J and their crank-shafts K L with the lower angular rakes E and their crank-shafts F G, substantially as herein shown and described.

SAMUEL M. MORRISON.

Witnesses:
 M. A. McCOID,
 W. B. CULBERTSON.